(12) United States Patent
Mounty et al.

(10) Patent No.: US 12,406,229 B2
(45) Date of Patent: Sep. 2, 2025

(54) LOCATION-AWARE COLLABORATION COMMUNICATIONS

(71) Applicant: Cisco Technology, Inc., San Jose, CA (US)

(72) Inventors: Jonathan C. Mounty, Milpitas, CA (US); Suneth Mercian Wilathgamuwage Don, Stabekk (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 287 days.

(21) Appl. No.: 17/983,534

(22) Filed: Nov. 9, 2022

(65) Prior Publication Data

US 2024/0152866 A1    May 9, 2024

(51) Int. Cl.
*G06Q 10/10* (2023.01)
*H04N 7/15* (2006.01)

(52) U.S. Cl.
CPC .............. *G06Q 10/10* (2013.01); *H04N 7/15* (2013.01)

(58) Field of Classification Search
CPC ................................ G06Q 10/10; H04N 7/15
See application file for complete search history.

(56) References Cited

U.S. PATENT DOCUMENTS

| | | | |
|---|---|---|---|
| 9,769,607 B2 | 9/2017 | Chu et al. | |
| 10,547,653 B2 * | 1/2020 | Rosenberg | G06F 3/1454 |
| 11,095,659 B2 | 8/2021 | Schirdewahn et al. | |
| 11,240,316 B1 * | 2/2022 | Gracey | H04L 65/4015 |
| 2010/0022230 A1 | 1/2010 | Shim et al. | |
| 2010/0315483 A1 | 12/2010 | King | |
| 2013/0027505 A1 | 1/2013 | Ranganath et al. | |
| 2014/0370817 A1 | 12/2014 | Luna | |
| 2015/0070461 A1 * | 3/2015 | Nace | H04M 1/72412 348/14.08 |
| 2016/0212181 A1 * | 7/2016 | Zhang | H04L 65/4015 |
| 2018/0124128 A1 * | 5/2018 | Faulkner | H04L 65/1093 |
| 2019/0173745 A1 | 6/2019 | Rjeili et al. | |
| 2019/0281091 A1 * | 9/2019 | Monson | H04L 65/1093 |
| 2021/0352081 A1 | 11/2021 | Schirdewahn et al. | |

OTHER PUBLICATIONS

Google, "Preview video calls with Knock Knock," Google Duo Help, retrieved from https://support.google.com/duo/answer/6376115?hl=en&co=GENIE.Platform%3DAndroid, Oct. 24, 2022, 2 pages.
Wikipedia, "Sensor fusion," https://en.wikipedia.org/wiki/Sensor_fusion, retrieved Sep. 27, 2022, 8 pages.
Video Window, "the worlds first always-on video conferencing portal," https://videowindow.com/, retrieved Oct. 24, 2022, 9 pages.

* cited by examiner

*Primary Examiner* — Benjamin M Thieu
(74) *Attorney, Agent, or Firm* — Edell, Shapiro & Finnan, LLC (57) ABSTRACT

Presented herein are techniques associated with facilitating location-aware collaboration communications among multiple users. In one example a method is provided that may include determining that a non-primary user of a first collaboration device is proximate to the first collaboration device; and based on determining that a primary user of the first collaboration device is not proximate to the first collaboration device, enabling the non-primary user to utilize the first collaboration device to initiate communication with at least one second collaboration device of the primary user.

20 Claims, 5 Drawing Sheets

LOCATION-AWARE COLLABORATION COMMUNICATIONS

TECHNICAL FIELD

The present disclosure relates to network equipment and services.

BACKGROUND

In hybrid work environments, employees are more transient. In such environments, employees often utilize multiple devices, such as smartphones, laptops, and tablets to perform job functions. The utilization of different devices creates new opportunities to improve interactions among employees that can utilize different devices at different locations.

DETAILED DESCRIPTION

Overview

The change from an office-centric work environment to hybrid work environments involving a mix of corporate office employees and home office (e.g., at an employee's residence) or otherwise remote employees (e.g., potentially able to work from any location in the world) has caused enterprises to reevaluate their capital expenditures for office devices, which—at least in the corporate office setting—can represent a waste of money for an enterprise entity (e.g., a business entity, a governmental entity, an educational entity, etc.) when such devices go unused by employees that are working remotely.

In some instances, it may be possible to use high value physical endpoints to display static office guidance, however, such uses of physical endpoints are merely the tip of the iceberg in terms of contextual information that could be provided to employees or, more generally, enterprise users.

In a hybrid environment, where corporate offices are at lower occupancy and users are more transient, it would be advantageous to better harness the value of endpoint devices, such as smart screens/displays, communication devices, etc., broadly referred to herein as "collaboration devices" in order to enable communications among users both within an office (e.g., local or in-person users) and outside the office (e.g., remote users).

Proposed herein are techniques that can be utilized to "bridge the gap" between remote and in-person workers in order to provide opportunities for improved interaction among a higher portion of the workforce, thereby improving value that can be provided by collaboration devices owned/operated by an enterprise entity. In particular, techniques herein may provide for enabling location-aware collaboration communications between an in-office user and a remote user via a collaboration device associated with the remote user that is located in-office, proximate to the in-office user.

In at least one embodiment, a computer-implemented method is provided that may include determining that a non-primary user of a first collaboration device is proximate to the first collaboration device, and based on determining that a primary user of the first collaboration device is not proximate to the first collaboration device, enabling the non-primary user to utilize the first collaboration device to initiate communication with at least one second collaboration device of the primary user. In one instance, determining that the non-primary user of the first collaboration device is proximate to the first collaboration device can be based on the first collaboration device detecting a third collaboration device (e.g., a personal or corporate/enterprise mobile phone) that is associated with the non-primary user being proximate to the first collaboration device (e.g., via wireless interactions, etc. between the first collaboration device and the third collaboration device).

Example Embodiments

In a hybrid environment, where offices are at lower occupancy and users are more transient it would be useful to better harness the value of endpoint or collaboration devices, such as smart screens/displays, communication devices (e.g., laptops, tablets, smartphones, etc.), and/or the like, in order to enable communications among users both within an office (e.g., local or in-person users) and outside the office (e.g., remote users). For example, a large number of personal video endpoint devices remain in offices and are often not used in hybrid work environments involving many remote users, which can lead to depreciation of such devices.

In accordance with embodiments herein, techniques are provided that help to "bridge the gap" between remote and in-person workers in order to provide opportunities for improved interaction among a higher portion of the workforce, thereby improving value that can be provided by collaboration devices owned/operated by an enterprise entity. In particular, techniques herein may provide for enabling location-aware collaboration communications between an in-office user and a remote user via a collaboration device associated with the remote user that is located in-office, proximate to the in-office user. Such features for enabling location-aware collaboration communications may be referred to herein as a "shoulder tap" feature in which the in-office user can "shoulder tap" the remote user for collaborating/communicating via various collaboration devices.

Figure 1:
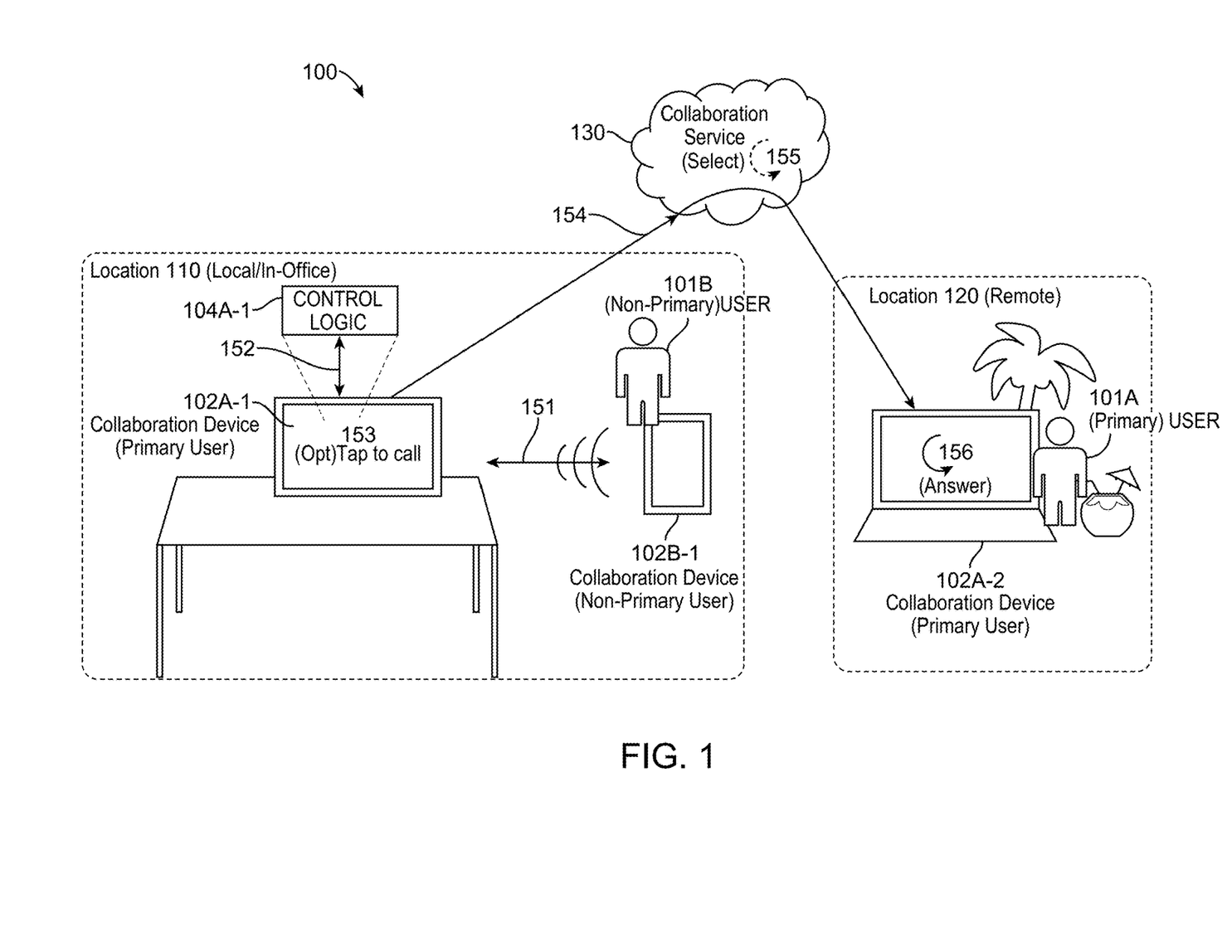
FIG. 1 is a block diagram of a system in which techniques that facilitate location aware collaboration communications may be implemented, according to an example embodiment.

Referring to FIG. 1, FIG. 1 is a block diagram of a system 100 in which techniques that facilitate location-aware collaboration communications may be implemented, according to an example embodiment.

A number of collaboration devices may be present in system 100 in which each collaboration device can be associated with a given user (e.g., enterprise employee, etc.). In accordance with embodiments herein, a user that is associated with a particular collaboration device is considered to be a "primary" user of the particular collaboration device (e.g., the primary user "tied-to" the particular collaboration device via a user identity or identifier (ID), subscription, certificate, etc. maintained or provisioned for the particular device). Conversely, a user that is not associated with the particular collaboration device, but who can utilize the particular collaboration device in accordance with embodiments herein is considered to be a "non-primary" user of the collaboration device.

As illustrated in FIG. 1, collaboration devices 102A-1 and 102A-2 are associated with a user 101A, which is considered to be the primary user of collaboration devices 102A-1 and 102A-2. Collaboration device 102B-1 that is associated with a user 101B is also shown in FIG. 1 such that user 101B is considered to be the primary user of collaboration device 102B-1 and can be considered to be a non-primary user of collaboration device 102A-1 (and of collaboration device 102A-2) in accordance with embodiments herein. Similarly, user 101A can be considered to be a non-primary user of collaboration device 102B-1.

FIG. 1 illustrates two locations at which the collaboration devices can be located. For example, a location 110 can be considered a "local" or "in-office" location at which collaboration device 102A-1 and user 101B/collaboration device 102B-1 are located such that user 101B is considered to be proximate to or physically near collaboration device 102A-1. In various embodiments, location 110 may be representative of a corporate office of an enterprise entity (e.g., business entity, government entity, educational entity, etc.) associated with both user 101A and user 101B in which the enterprise entity facilitates collaboration communications among collaboration devices 102A-1, 102A-2, and 102B-1 via a calling or collaboration service 130. In various embodiments, collaboration service 130 can be representative of any service that facilitates data, audio, and/or video communications among collaboration devices 102A-1, 102A-2, and 102B-1 via any combination of communication technologies, such as cellular communication technologies, Institute of Electrical and Electronics Engineers (IEEE) 802.11 communication technologies, and/or the like.

A location 120 shown in FIG. 1 can be considered a "remote" location at which user 101A/collaboration device 102A-2 are located such that user 101A is considered to be proximate to or physically near collaboration device 102A-2. Location 120 may be considered to be remote relative to location 110 in that location 120 may be geographically remote or separated away from location 110 by some physical distance such that user 101A would not be considered to be proximate to or physically near collaboration device 102A-1.

Each collaboration device 102A-1, 102A-2, and 102B-1 may be associated with any person, user, subscriber, employee, client, customer, and/or the like for which collaboration communications may be facilitated/managed by a given enterprise entity via collaboration service 130 and may be inclusive of any device that initiates a communication in the system, such as a computer, a laptop or electronic notebook, a cellular/Wi-Fi enabled telephone/smart phone, tablet, etc. and/or any other device, component, element, or object capable of initiating voice, audio, video, media, or data exchanges within system 100. Each collaboration device 102A-1, 102A-2, and 102B-1 may include corresponding communication input/output (I/O) interface(s) each of which may include any combination of hardware (e.g., communications units, receiver(s), transmitter(s), antenna(s) and/or antenna array(s), processor(s), memory element(s), baseband processor(s) (modems), etc.), controllers (e.g., wireless local area network controllers, etc.), software, logic, and/or any other elements/logic that may facilitate wireless and/or wired communications and/or connections among one or more elements of system 100.

It is to be understood that each collaboration device 102A-1, 102A-2, and 102B-1 may include/be configured with any other hardware, software, operating system, I/O interfaces, processor(s), memory element(s), storage, etc. to facilitate/interface with one or more displays, keyboards, microphones, speakers, etc. In accordance with embodiments herein collaboration devices can be provisioned/configured with any combination of software, logic, etc., such as control logic 104A-1 that can be configured for collaboration device 102A-1 as shown in FIG. 1.

In various embodiments, control logic 104A-1 can include instructions that, when executed, cause processor(s) (not shown) of collaboration device 102A-1 to perform operations, which can include, but not be limited to, providing overall control operations of collaboration device 102A-1; interacting with other entities, elements, systems, etc. described herein; maintaining and/or interacting with stored data, information, parameters, etc. (e.g., memory element(s), storage, data structures, databases, tables, etc.), for example, to determine user information, permission information, status information, etc. for primary and/or non-primary user(s) of collaboration device 102A-1; combinations thereof; and/or the like to facilitate various operations for embodiments described herein. In some embodiments, control logic 104A-1 may be implemented in whole or in part as an application programming interface (API), such as a status API or the like to facilitate operations as discussed for embodiments herein.

During operation in accordance with embodiments herein, user proximity detection can be provided based on sensor fusion. Generally, sensor fusion is a process through which data can be combined from multiple disparate sources (e.g., multiple collaboration devices and/or multiple sensors on the same physical devices, such as cameras, radio frequency (RF) chips, etc.) such that the resultant combined data provides less uncertainty than may otherwise be possible from data obtained from each source individually. In accordance with embodiments herein, user proximity detection can be provided based on sensor fusion in which collaboration devices can be associated with different users (e.g., primary versus (vs) non-primary users).

Through embodiments discussed herein, efficient collaboration communications can be provided in hybrid work environments using user proximity detection, which can be provided using any proximity detection techniques now known in the art or hereinafter developed. For example, consider a scenario involving system 100 in which a more natural hybrid work style can be enabled by providing features for collaboration devices whereby non-primary users, such as user 101B, who are not owners or primary users of an owned (e.g., logged-in) personal collaboration device, such as collaboration device 102A-1, are proximate to the collaboration device, the non-primary user of the collaboration device, user 101B in this example, can "tap on the shoulder" ("shoulder tap") of the primary user that is not proximate to the collaboration device 102A-1, user 101A in this example, in order to initiate communication with another collaboration device with which the primary user is proximate, such as collaboration device 102A-2. By "not proximate" or "not near" collaboration device 102A-1, it is meant that user 101A is not at the same physical location as collaboration device 102A-1, location 110 (e.g., user 101A is not at their desk or in their office where collaboration device 102A-1 is located) but rather users 101A is at a remote location, such as location 120, and is proximate to collaboration device 102A-2.

Such a feature would be available when a non-primary user is in proximity of a particular collaboration device, while the owner/primary user of the particular collaboration device is not in proximity of the particular collaboration device. In one embodiment, when tapped (e.g., via a user interface (UI) interaction of a UI "call" button or the like on a touch screen of the given collaboration device), the particular collaboration device could initiate a video call to the primary user that is assigned or otherwise associated to the particular collaboration device. The call could be initiated with another collaboration device of the primary user, which could be determined through intelligent device selection. In one embodiment, status information could be displayed on the particular collaboration device to avoid a non-primary user initiating a call with a primary user that has a status set, for example, to "Do not Disturb" or who is busy in another meeting.

In another embodiment, the particular collaboration device could automatically initiate a call with another device of the primary user without the non-primary user interacting with the particular collaboration device. For example, a call to the endpoint owner of a particular collaboration device could be automatically initiated (e.g., with zero physical contact by a non-primary user with the collaboration device) based on detecting that a non-primary user is proximate to the collaboration device while the primary user of the device is not proximate to the device.

In one embodiment, the process of initiating a call or joining a teleconference could be made more personal by using functionality in which an image of the calling (non-primary) user could be displayed via a collaboration device of the primary user in order for the primary user to determine who is calling before answering the call.

In some embodiments, call security could be provided for a primary user such that upon detection of a foreign user being proximate to a collaboration device that would otherwise enable a call to the primary user, such as collaboration device 102A-1, sensitive functionality, such as but not limited to, one-button call join functionality, functionality that could perceivably display sensitive user information (e.g., calendar information, etc.), and/or the like could be inhibited or disabled on the collaboration device 102A-1 (e.g., to avoid foreign users from snooping on others' meetings and bypassing protections using that user's privileges). For example, if a foreign user that is not associated with/employed by the enterprise entity associated with collaboration device 102A-1 is detected as being proximate to the device, then functionality to enable a call to the primary user 101A could be disabled on collaboration device 102A-1.

In some embodiments, intelligent selection of a collaboration device that is to receive a call can be facilitated via collaboration service 130 by determining the presence or proximity of a primary user with a given collaboration device, such as with collaboration device 102A-2. In one embodiment, presence may be determined based information gathered for multiple collaboration devices associated with a primary user. For example, a laptop of the primary user detecting the presence of the primary user's smartphone could be used to determine that the primary user is proximate to the laptop. In another embodiment, log-in history could be used to determine the presence of the primary user for a given collaboration device. For example, the primary user being logged into a calling service on a particular collaboration device could be used to determine that the user is proximate or present at the particular collaboration device.

Accordingly, operations facilitated via system 100 that provide for location-aware collaboration communications may include, but not be limited to, determining that a non-primary user of a first collaboration device is proximate to the first collaboration device (e.g., user 101B is determined to be proximate to collaboration device 102A-1 that is associated with (primary) user 101A) and, based on determining that the primary user of the first collaboration device is not proximate to the first collaboration device (e.g., user 101A is at location 120 and, thus, is not proximate to collaboration device 102A-1), enabling the non-primary user (e.g., user 101B) to utilize the first collaboration device (e.g., collaboration device 102A-1) to initiate communication with at least one second collaboration device of the primary user (e.g., collaboration device 102A-2).

The non-primary user, user 101B in this example, can be determined to be proximate to collaboration device 102A-1 based on collaboration device 102A-1 detecting the presence of the (non-primary) user 101B via wireless interactions between collaboration device 102A-1 and collaboration device 102B-1 that is associated with (non-primary) user 101B (e.g., a smartphone carried by user 101B).

Consider various operations that may be associated with providing location-aware collaboration communications via the system 100 of FIG. 1. For example, as shown at 151, consider that when user 101B that is carrying collaboration device 102B-1 is proximate or near a collaboration device for which user 101B is not the primary user, such as collaboration device 102A-1, a wireless proximity handshake can be performed between collaboration device 102B-1 and collaboration device 102A-1 such that collaboration device 102A-1 detects the presence of collaboration device 102B-1 and, as a result user 101B, as being near collaboration device 102A-1.

In various embodiments, the proximity handshake at 151 can be performed using any wireless communications through which location or presence of a device can be determined, such as ultrasound communications, near field communication (NFC), Bluetooth communications, etc. through which identifying information for user 101B and/or collaboration device 102B-1 can be provided to collaboration device 102A-1. In various embodiments, such identifying information can include any of a user identifier/identity (ID) of user 101B stored via collaboration device 102B-1, a hardware identifier of collaboration device 102B-1, an identifier associated with logic configured for collaboration device 102B-1, combinations thereof, and/or the like can be provided to collaboration device 102A-1.

In various embodiments, an identifier for a user associated with a particular collaboration device for which proximity is detected by another collaboration device may include a username, user credentials (e.g., employee ID, etc.), a network address identifier (NAI) (e.g., user101A@enterprise.com), an International Mobile Subscriber Identity (IMSI), a Universal Unique Identifier (UUID), certificate, any anonymous identifier that could be used to query a remote (e.g., cloud) service that could return whether a device is registered to a primary registered user or not (without providing any more/sensitive information about who the non-primary user is), combinations thereof, and/or the like. In various embodiments, a hardware identifier a particular collaboration device for which proximity is detected by another collaboration device could include a Media Access Control (MAC) address, an International Mobile Station Equipment Identity (IMEI), device/hardware fingerprinting (e.g., based on Bluetooth broadcast name and/or some combination of hardware factors/identifiers), combinations thereof and/or the like. In various embodiments, an identifier associated with logic configured for a particular collaboration device for which proximity is detected by another collaboration device could include a username for an application configured for the collaboration device (e.g., a username, etc. for a calling service, collaboration service, application installation identifier/ad tracking identifier and/or any other anonymized identifier, etc. configured for the collaboration device), logic identifying information (e.g., application identifier, version number, etc.), combinations thereof, and/or the like.

Through the proximity handshake at 151, collaboration device 102A-1 detects the presence of collaboration device 102B-1 and, as a result user 101B, as being near collaboration device 102A-1, which can trigger the collaboration device 102A-1 to perform various operations as shown at 152 via control logic 104A-1 including fetching/validating information for user 101B associated with collaboration device 102B-1 in relation to information for user 101A that is identified as the primary user of collaboration device 102A-1 such that collaboration device 102A-1 can determine that user 101B is not the primary user of collaboration device 102A-1, rather user 101B is a non-primary user that is proximate or near collaboration device 102A-1.

In some embodiments, the operations at 152 can include determining that user 101B is associated with the enterprise entity facilitating collaboration communications via collaboration service 130 and, thus is allowed/authorized to utilize the shoulder tap functionality provided by collaboration device 102A-1, as opposed to a foreign user that would not be allowed/authorized to utilize the shoulder tap functionality such that functionality for initiating a call to the primary user 101A of collaboration device 102A-1 would be inhibited or disabled on the collaboration device 102A-1. In some embodiments, the operations at 152 may include querying an authentication/authorization server or database (not shown) of the enterprise entity using the identifying information for user 101B and/or collaboration device 102B-1 in order to identify whether user 101B is allowed/authorized to utilize the shoulder tap functionality.

The operations at 152 can include fetching/obtaining permissions and/or status information associated with user 101A that facilitate determining that the primary user of collaboration device 102A-1, user 101A in this example, is not proximate or near collaboration device 102A-1. For example, in some embodiments, collaboration device 102A-1 via control logic 104A-1 (and potentially via collaboration service 130) can determine that user 101A is logged-in to collaboration device 102A-2 that is located at a remote location, such as location 120, that is not proximate or near location 110 at which collaboration device 102A-1 is located. In some embodiments, collaboration device 102A-1 via control logic 104A-1 (and potentially via collaboration service 130) can determine that user 101A is proximate to collaboration device 102A-2 that is located at the (remote) location 120 based on activity information for the collaboration device 102A-2 indicating that the primary user has been active on the collaboration device 102A-2 within a threshold amount of time (e.g., within the last 10 minutes, etc.). In still some embodiments, collaboration device 102A-1 can determine that user 101A is not proximate or near collaboration device 102A-1 by collaboration device 102A-1 not performing a proximity handshake with another device associated with user 101A (e.g., a mobile phone, etc. carried by user 101A that might be used to detect the proximity of user 101A being near collaboration device 102A-1). Other information for determining that a primary user is not near a given collaboration device could be envisioned.

Upon determining that the primary user of the collaboration device 102A-1, user 101A, is not proximate to the collaboration device 102A-1, collaboration device 102A-1 can enable the shoulder tap functionality by enabling the non-primary user, user 101B in this example, to utilize the collaboration device to initiate communication with another collaboration device associated with the primary user 101A. In one at least embodiment, as shown at 153, collaboration device 102A-1 can provide a UI button or feature for the shoulder tap functionality, which enables the non-primary user 101B to initiate a call to another collaboration device of the primary user 101A by providing an input to collaboration device 102A-1 (e.g., non-primary user 101B tapping/pressing the UI button) to initiate the call. In at least one embodiment upon determining that the primary user 101A of the collaboration device 102A-1 is not proximate to the collaboration device 102A-1, collaboration device 102A-1 can provide the should tap functionality by automatically initiating a call to another collaboration device of the primary user (e.g., based on permissions configured by the primary user 101A to allow such automatic communications, based on no "Do Not Disturb" settings being active for the primary user, etc.).

In at least one embodiment, upon determining that the primary user, 101A, of the collaboration device 102A-1 is not proximate to the collaboration device 102A-1, collaboration device 102A-1 via control logic 104A-1 can check the status of the primary user 101A to confirm that the primary user does not have a "Do Not Disturb" setting active before enabling the communication functionality for the collaboration device 102A-1.

Upon enabling the non-primary user 101B with the ability to utilize collaboration device 102A-1 for a communication to at least one other collaboration device of the primary user 101A, a call or teleconference to the at least one other collaboration device of the primary user can be initiated via the collaboration device 102A-1 and collaboration service 130, as shown at 154. The call/teleconference can be initiated using the user ID of the non-primary user 101B so that the primary user 101A can identify who is calling (e.g., to avoid the primary user 101A from thinking that they are calling themselves). In one embodiment, the process of initiating a call or teleconference could be made more personal by using "knock-knock" functionality in which an image of the calling (non-primary) user 101B could be displayed via a collaboration device of the primary user 101A in order for the primary user 101A to determine who is calling before answering the call.

In at least one embodiment, collaboration service 130 can direct the call to all collaboration devices associated with the primary user 101A, such as collaboration device 102A-2 and any other collaboration devices (not shown) associated with the primary user 101A. In another embodiment, collaboration service 130 can select, as shown at 155, a particular collaboration device of the primary user 101A, such as collaboration device 102A-2, to which to direct the call based on activity information for the collaboration device 102A-2 indicating that the primary user 101A has been active on the collaboration device 102A-2 within a threshold amount of time (e.g., within the last 5-10 minutes, etc.). In another embodiment, collaboration service 130 can select a particular collaboration device of the primary user, such as collaboration device 102A-2, to which to direct the call based on location information for the primary user 101A indicating their proximity being near collaboration device 102A-2. In one embodiment, the location of primary user 101A being proximate or near collaboration device 102A-2 can be based on location information for the primary user 101A maintained by collaboration service 130 and/or reported by collaboration device 102A-2 to collaboration service based on a proximity handshake being performed between another collaboration device of primary user 101A (e.g., a mobile phone carried by the primary user 101A) and collaboration device 102A-2 in which location information for the user is reported to collaboration service 130. Other variations for selecting a particular collaboration device of a primary user to which to direct a communication can be envisioned.

Upon receiving an indication of the call on collaboration device 102A-2, the primary user 101A can answer the call via collaboration device 102A-2 at location 120, as shown at 156, to complete the call. For example, primary user can interact (click, touch, select, etc.) with collaboration device 102A-2 to answer the call.

Accordingly, techniques herein may provide facilitate location-aware collaboration communications between an in-office user and a remote user via a collaboration device associated with the remote user that is located in-office, proximate to the in-office user utilizing various "shoulder tap" functionality as discussed for various embodiments. Such techniques can be utilized to bridge the gap between remote and in-person workers in order to provide opportunities for improved interaction among a higher portion of the workforce, thereby improving value that can be provided by collaboration devices owned/operated by an enterprise entity.

Such techniques may also help to reduce the effect of a "siloed" workforce, for example, if somebody in the office doesn't know who members of a team they need to work with personally, but they know the area of the office where they sit, techniques as discussed for embodiments herein would enable such workers to make an initial contact more efficiently, and more personally, than, for example, initiating communication via team or group room of a collaboration service or raising a support ticket.

Figure 2:
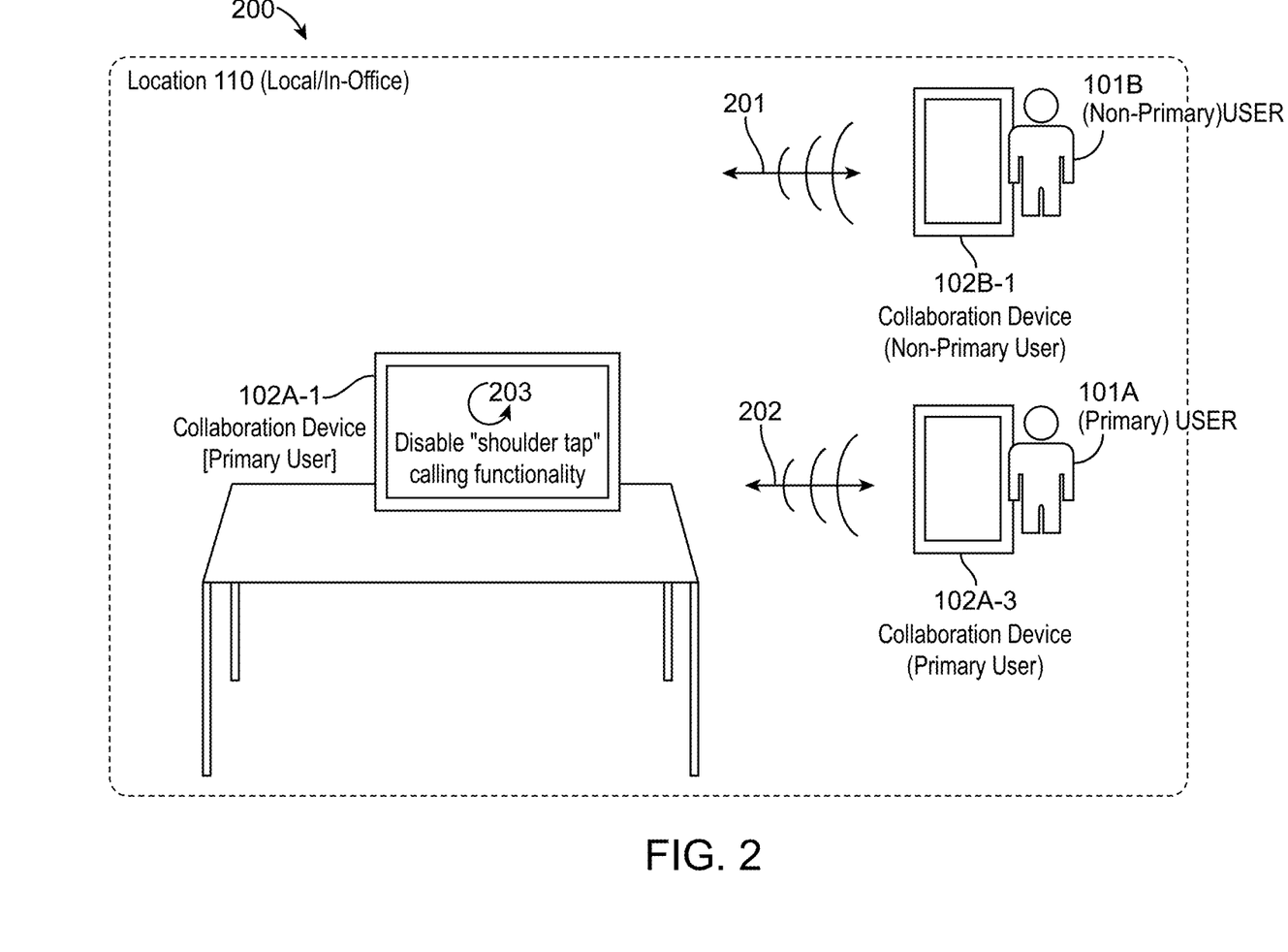
FIG. 2 is a block diagram illustrating an example use case in which collaboration communications may be disabled for a non-primary user of a collaboration device, according to an example embodiment.

Referring to FIG. 2, FIG. 2 is a block diagram 200 illustrating example details associated with an example use case in which collaboration communications may be disabled for a non-primary user of a collaboration device, according to an example embodiment. FIG. 2 includes collaboration device 102A-1 and another collaboration device 102A-3 that are associated with the (primary) user 101A and collaboration device 102B-1 that is associated with (non-primary) user 101B in which all collaboration devices 102A-1, 102A-3 and 102B-1 are located at location 110.

In the case where the device owner/primary user associated with a particular collaboration device, such as user 101A associated with collaboration device 102A-1, is present simultaneously with a non-primary user, the "shoulder tap" functionality for allowing a non-primary user of the collaboration device 102A-1, such as user 101B, can be disabled or otherwise inhibited on the collaboration device 102A-1.

For example, as illustrated in FIG. 2, a proximity handshake can be performed between collaboration device 102A-1 and 102B-1 associated with the non-primary user 101B, as shown at 201, such that collaboration device 102A-1 can detect the presence of non-primary user 101B being proximate to collaboration device 102A-1. Another proximity handshake can be performed between collaboration device 102A-1 and 102A-3 associated with the primary user 101A, as shown at 202, such that collaboration device can also detect the presence of primary user 101A also being proximate to collaboration device 102A-1. In some instances, the behavior at 202 may be suppressed. For example, if certain collaboration devices are always together such that if a user has a device and a desktop that stay in the same place, logic could be configured to ignore such proximities of commonly located devices in which case other devices/mechanisms could be used to determine primary user 101A proximity as being near/proximate to collaboration device 102A-1 (e.g., the primary user is active/has been recently (within a threshold amount of time) logged-in to collaboration device 102A-1, or similar logic).

Based on collaboration device 102A-1 determining that the primary user 101A of the collaboration device 102A-1 is proximate to or near the collaboration device 102A-1, the "shoulder tap" functionality can be disabled for the collaboration device 102A-1, as shown at 203, such that the non-primary user 101B would be inhibited from utilizing the collaboration device 102A-1 to initiate collaboration communications with another collaboration device of the primary user 101A.

Figure 3:
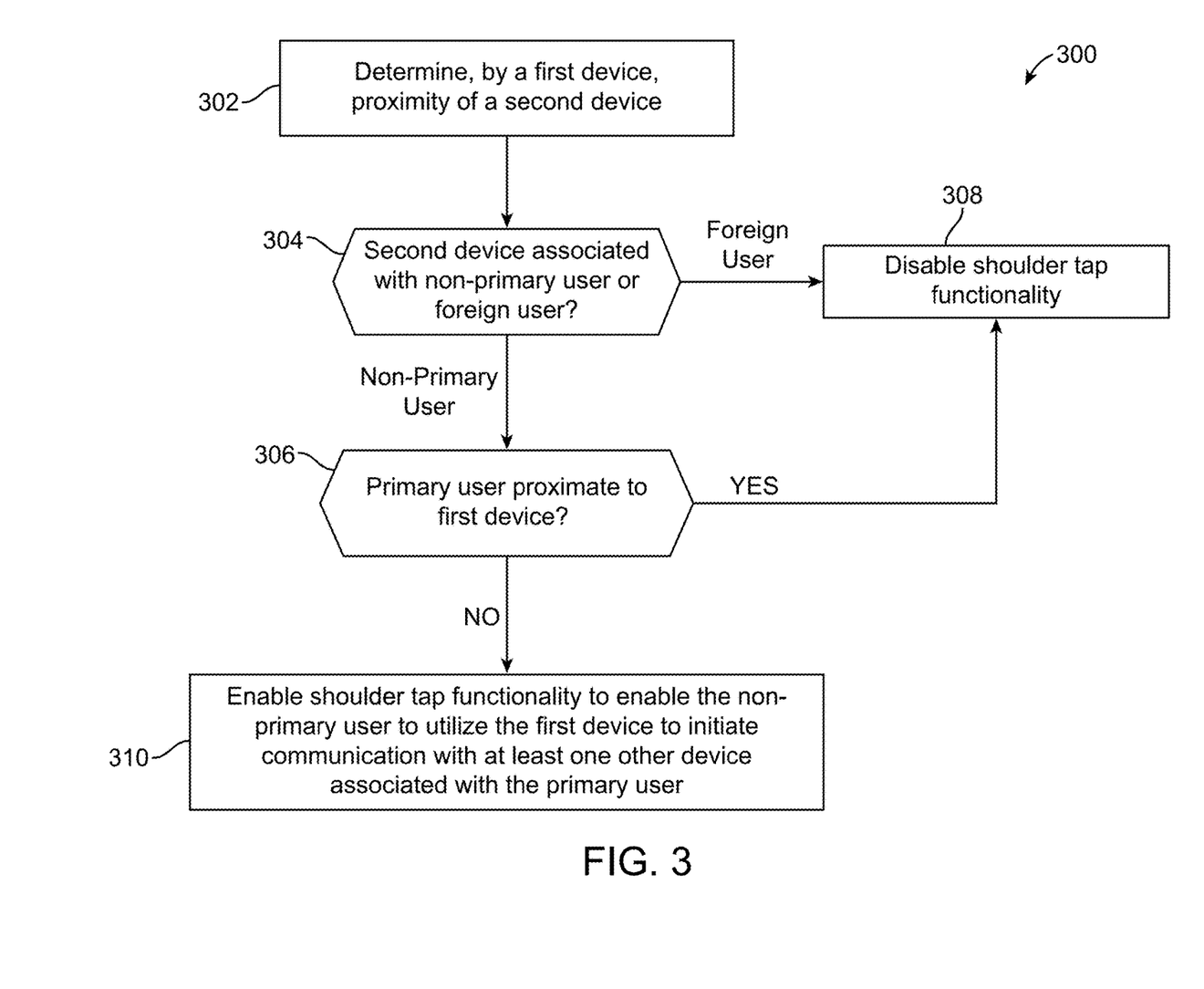
FIG. 3 is a flow chart depicting a method according to an example embodiment.

Referring to FIG. 3, FIG. 3 is a flow chart depicting a method 300 according to an example embodiment. In at least one embodiment, operations associated with method 300 may be performed, at least in part, by a collaboration device of a user, such as collaboration device 102A-1 associated with primary user 101A, as discussed for embodiments herein.

At 302, the method may include determining, by a first device associated with a first user (e.g., collaboration device 102A-1 associated with user 101A) proximity of a second device of a second user (e.g., collaboration device 102B-1). In one embodiment, the determining at 302 can be based on a proximity handshake or other proximity detection mechanism through which the first device can detect that the second device is proximate to or near the first device.

At 304, the method may include the first device determining whether the second device is associated a non-primary user that could be allowed/authorized to utilize a shoulder tap functionality of the first device or is associated with a foreign user that would not be allowed/authorized to utilize the shoulder tap functionality. In some embodiments, operations performed at 304 may include querying an authentication/authorization server or database (not shown) stored locally on the first device or accessible remotely by the first device using the identifying information for the second user and/or the second device obtained through the proximity handshake/proximity detection of the second device.

In one instance, if the first device determines at 304 that the second device is associated with a foreign user, the operations may continue to 308 at which the first device disables the shoulder tap functionality, and the method may end.

In another instance, if the first device determines at 304 that the second device is associated with a non-primary, but allowed/authorized, user that may utilize the shoulder tap functionality of the first device, the operations can continue to 306 at which the first device can determine whether the first user of the first device is proximate to the first device. For example, if the first device performs a proximity handshake with another device of the first user (e.g., a mobile phone of the first user), then the first device can determine that the first user is proximate to the first device (YES at 306) such that the operations can proceed to 308 at which the first device disables the shoulder tap functionality, and the method may end. Other operations may be performed to determine whether the first user is proximate to the first device (e.g., determining that the first user is logged-in to another device at a location different than the location of the first device, determining a location of the first user being different than the location of the first device, etc.).

Returning to the operations at 306, upon determining by the first device that the first user is not proximate to the first device, the operations can continue to 310 at which the first device can enable the shoulder tap functionality in order to enable the second (non-primary) user to initiate communication with at least one other device associated with the first (primary) user via a corresponding collaboration service that facilitates communications for devices associated with the first and second user. The communication can be initiated using a user identity of the second (non-primary) user. In one embodiment, the communication can be initiated by the second (non-primary) user based on at least one user input provided to the first device by the second user (e.g., tapping a "call" button, etc.). In one embodiment, the communication can be initiated automatically by the first device. In one embodiment, the communication can be initiated automatically by the first device following confirmation by the first device that the first user has not activated any mechanism/permission/setting to prohibit such communications, such as activating a "Do Not Disturb" setting for the collaboration service by the first user, etc.

Figure 4:
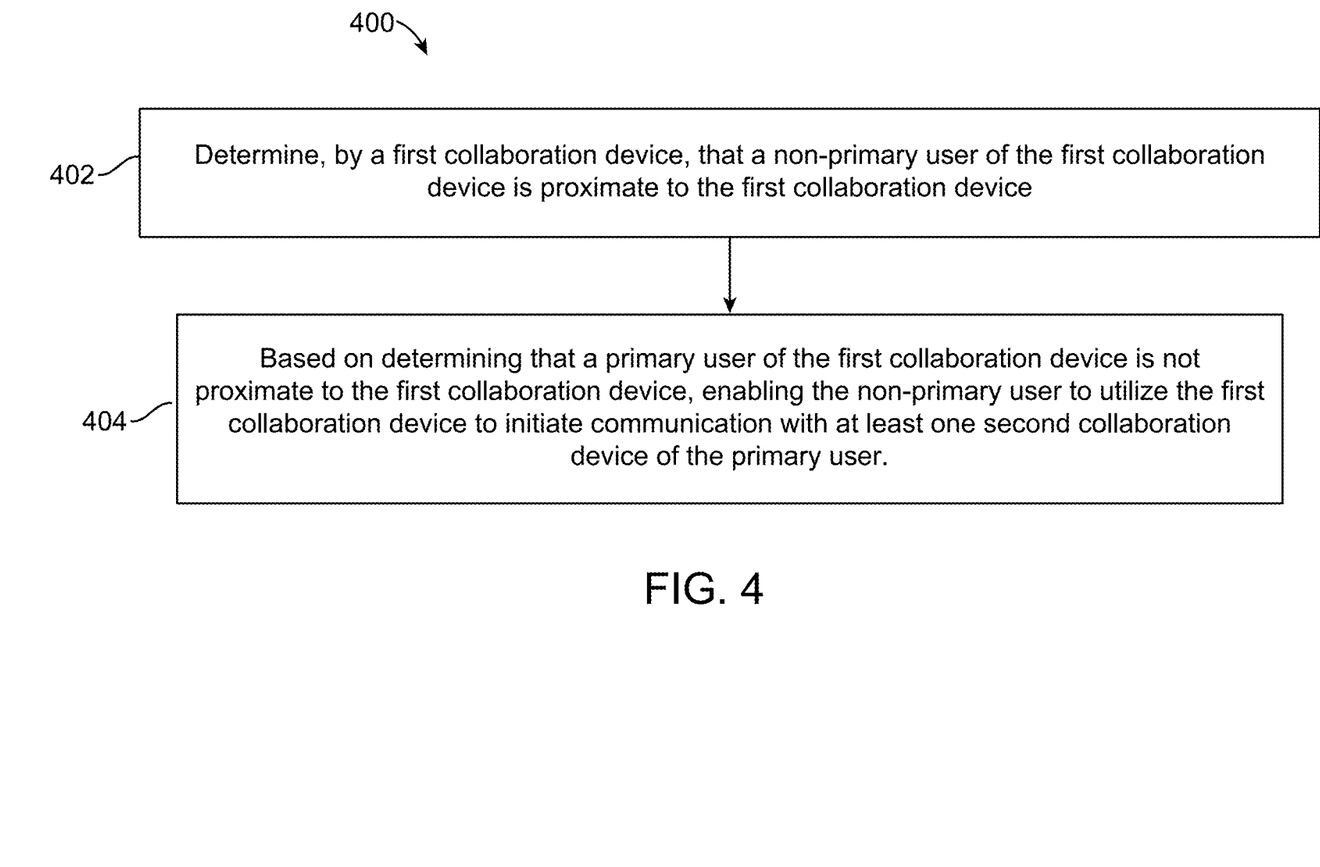
FIG. 4 is a flow chart depicting another method according to an example embodiment.

Referring to FIG. 4, FIG. 4 is a flow chart depicting another method 400 according to an example embodiment. In at least one embodiment, operations associated with method 400 may be performed, at least in part, by a collaboration device of a user, such as collaboration device 102A-1 associated with primary user 101A, as discussed for embodiments herein.

At 402, the method may include determining, by a first collaboration device, that a non-primary user of the first collaboration device is proximate to the first collaboration device. In one embodiment, the determining at 402 can be based on a proximity handshake or other proximity detection mechanism through which the first collaboration device can detect that a collaboration device associated with the non-primary user being proximate to or near the first collaboration device. The detecting can be based on wireless communications between the first collaboration device and the collaboration device of the non-primary user through which the first collaboration device determines that the collaboration device is associated with the non-primary user based on identifying information determined/obtained for the non-primary user and/or the device of the non-primary user. The identifying information can include any combination of a user identifier associated with the non-primary user, a hardware identifier associated with the collaboration device of the non-primary user, and/or an identifier associated with logic configured for the collaboration device of the non-primary user.

At 404, the method may include based on determining that a primary user of the first collaboration device is not proximate to the first collaboration device, enabling the non-primary user to utilize the first collaboration device to initiate communication with at least one second collaboration device of the primary user. In one embodiment the first collaboration device can initiate the communication with the at least one second collaboration device of the primary user upon obtaining an input from the non-primary user to the first collaboration device. In one embodiment, the first collaboration device can automatically initiate the communication with the at least one second collaboration device of the primary user without the non-primary user interacting with the first collaboration device.

Figure 5:
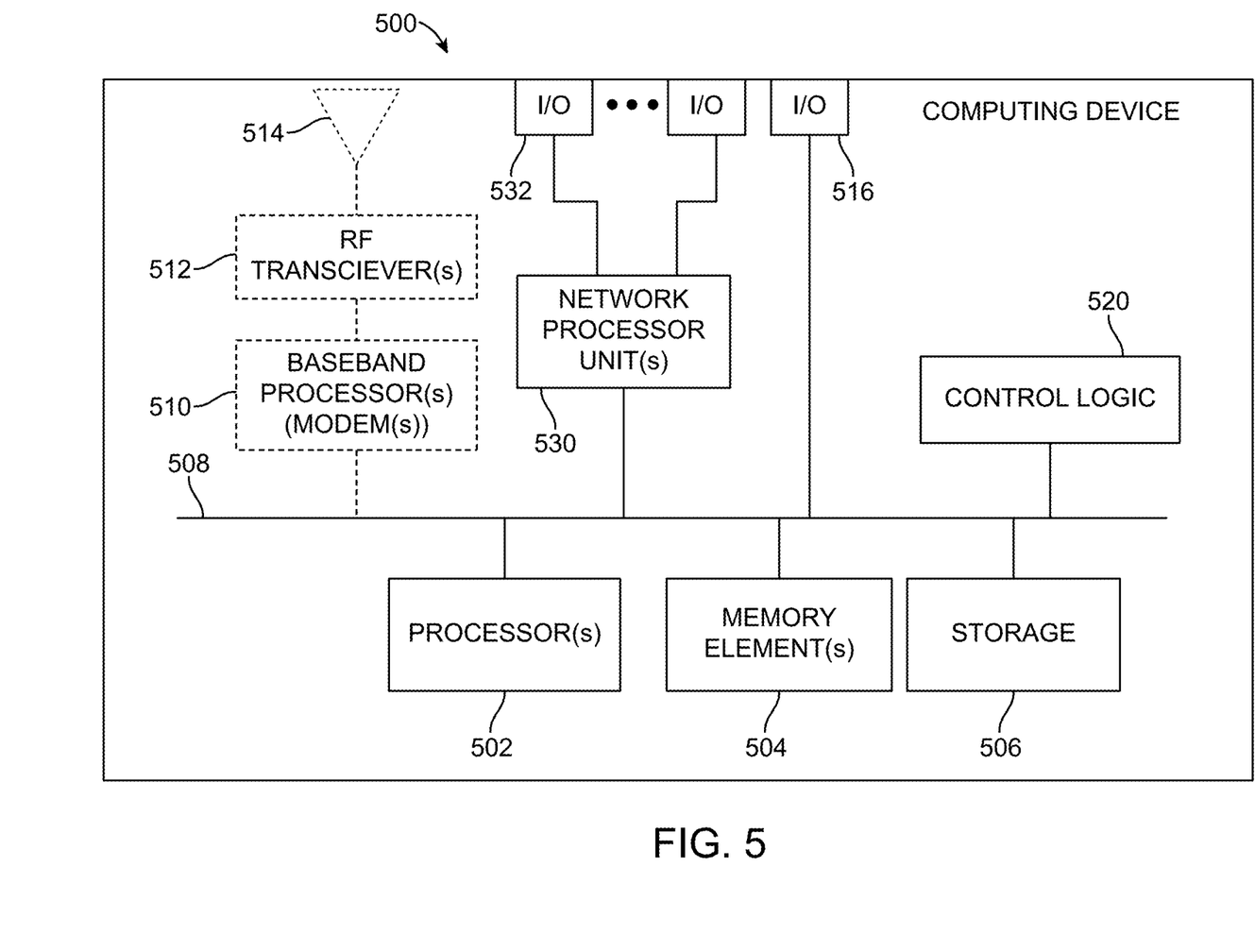
FIG. 5 is a hardware block diagram of a computing device that may perform functions associated with any combination of operations, in connection with the techniques discussed herein.

Referring to FIG. 5, FIG. 5 illustrates a hardware block diagram of a computing device 500 that may perform functions associated with operations discussed herein. In various embodiments, a computing device or apparatus, such as computing device 500 or any combination of computing devices 500, may be configured as any entity/entities as discussed herein (e.g., collaboration device 102A-1, 102A-2, 102A-3, and/or 102B-1 and/or any combination of devices facilitating collaboration service 130) in order to perform operations of the various techniques discussed herein.

In at least one embodiment, computing device 500 may be any apparatus that may include one or more processor(s) 502, one or more memory element(s) 504, storage 506, a bus 508, one or more I/O interface(s) 516, control logic 520 (e.g., calendar logic/scheduling logic, as discussed herein), one or more one network processor unit(s) 530 and one or more network I/O interface(s) 532. In various embodiments, instructions associated with logic for computing device 500 can overlap in any manner and are not limited to the specific allocation of instructions and/or operations described herein.

For embodiments in which computing device 500 may be implemented as any device capable of wireless communications (e.g., collaboration devices 102A-1, 102B-1, and 102A-3), computing device 500 may further include at least one baseband processor or modem 510, one or more radio RF transceiver(s) 512, one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that are configured for computing device 500. In at least one embodiment, bus 508 is implemented as a fast kernel-hosted interconnect, potentially using shared memory between processes (e.g., logic), which can enable efficient communication paths between the processes.

Network processor unit(s) 530 may enable communication between computing device 500 and other systems, devices, or entities, via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 500 and other systems, devices, or entities to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that are connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 500 supports a display having touch-screen display capabilities.

For embodiments in which computing device 500 is implemented as a user device or any other apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520 can include instructions that, when executed, cause processor(s) 502 to perform operations, which can include, but not be limited to, providing overall control operations of computing device 500; interacting with other entities, elements, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520 of computing device 500) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 504 of computing device 500) and/or storage (e.g., storage 506 of computing device 500) can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include determining that a non-primary user of a first collaboration device is proximate to the first collaboration device; and based on determining that a primary user of the first collaboration device is not proximate to the first collaboration device, enabling the non-primary user to utilize the first collaboration device to initiate communication with at least one second collaboration device of the primary user.

In one instance, determining that the non-primary user of the first collaboration device is proximate to the first collaboration device is based on the first collaboration device detecting a third collaboration device that is associated with the non-primary user being proximate to the first collaboration device. In one instance, the detecting is based on wireless communications between the first collaboration device and the third collaboration device of the non-primary user and the detecting includes determining that the third collaboration device is associated with the non-primary user.

In one instance, determining that the third collaboration device is associated with the non-primary user is based on at least one of: a user identifier associated with the non-primary user; a hardware identifier associated with the third collaboration device of the non-primary user; or an identifier associated with logic configured for the third collaboration device of the non-primary user.

In one instance, the enabling includes: determining a particular second collaboration device with which to initiate the communication based on activity information for the particular second collaboration device indicating that the primary user has been active on the particular second collaboration device within a threshold amount of time.

In one instance, the method may further include one of: the first collaboration device initiating the communication with the at least one second collaboration device of the primary user upon obtaining an input from the non-primary user to the first collaboration device; or the first collaboration device automatically initiating the communication with the at least one second collaboration device of the primary user without the non-primary user interacting with the first collaboration device. In one instance, the communication is initiated using a user identity of the non-primary user.

In one instance, the method may further include based on determining that the primary user of a first collaboration device is proximate to the first collaboration device, disabling the non-primary user from utilizing the first collaboration device to initiate communication with the at least one second collaboration device of the primary user.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    determining that a non-primary user of a first collaboration device is proximate to the first collaboration device; and
    based on determining that a primary user of the first collaboration device is not proximate to the first collaboration device, enabling the non-primary user to utilize the first collaboration device to initiate communication with at least one second collaboration device of the primary user.

2. The method of claim 1, wherein determining that the non-primary user of the first collaboration device is proximate to the first collaboration device is based on the first collaboration device detecting a third collaboration device that is associated with the non-primary user being proximate to the first collaboration device.

3. The method of claim 2, wherein the detecting is based on wireless communications between the first collaboration device and the third collaboration device of the non-primary user and the detecting includes determining that the third collaboration device is associated with the non-primary user.

4. The method of claim 3, wherein determining that the third collaboration device is associated with the non-primary user is based on at least one of:
    a user identifier associated with the non-primary user;
    a hardware identifier associated with the third collaboration device of the non-primary user; or
    an identifier associated with logic configured for the third collaboration device of the non-primary user.

5. The method of claim 1, wherein the enabling includes:
    determining a particular second collaboration device with which to initiate the communication based on activity information for the particular second collaboration device indicating that the primary user has been active on the particular second collaboration device within a threshold amount of time.

6. The method of claim 1, further comprising one of:
    the first collaboration device initiating the communication with the at least one second collaboration device of the primary user upon obtaining an input from the non-primary user to the first collaboration device; or
    the first collaboration device automatically initiating the communication with the at least one second collaboration device of the primary user without the non-primary user interacting with the first collaboration device.

7. The method of claim 6, wherein the communication is initiated using a user identity of the non-primary user.

8. The method of claim 1, further comprising:
    based on determining that the primary user of a first collaboration device is proximate to the first collaboration device, disabling the non-primary user from utilizing the first collaboration device to initiate communication with the at least one second collaboration device of the primary user.

9. One or more non-transitory computer readable storage media encoded with instructions that, when executed by a processor, cause the processor to perform operations, comprising:
    determining that a non-primary user of a first collaboration device is proximate to the first collaboration device; and
    based on determining that a primary user of the first collaboration device is not proximate to the first collaboration device, enabling the non-primary user to utilize the first collaboration device to initiate communication with at least one second collaboration device of the primary user.

10. The media of claim 9, wherein determining that the non-primary user of the first collaboration device is proximate to the first collaboration device is based on the first collaboration device detecting a third collaboration device that is associated with the non-primary user being proximate to the first collaboration device.

11. The media of claim 10, wherein the detecting is based on wireless communications between the first collaboration device and the third collaboration device of the non-primary user and the detecting includes determining that the third collaboration device is associated with the non-primary user.

12. The media of claim 11, wherein determining that the third collaboration device is associated with the non-primary user is based on at least one of:
   a user identifier associated with the non-primary user;
   a hardware identifier associated with the third collaboration device of the non-primary user; or
   an identifier associated with logic configured for the third collaboration device of the non-primary user.

13. The media of claim 9, wherein the enabling includes:
   determining a particular second collaboration device with which to initiate the communication based on activity information for the particular second collaboration device indicating that the primary user has been active on the particular second collaboration device within a threshold amount of time.

14. The media of claim 9, further encoded with instructions that, when executed by the processor, cause the processor to perform further operations, comprising one of:
   the first collaboration device initiating the communication with the at least one second collaboration device of the primary user upon obtaining an input from the non-primary user to the first collaboration device; or
   the first collaboration device automatically initiating the communication with the at least one second collaboration device of the primary user without the non-primary user interacting with the first collaboration device.

15. The media of claim 9, further encoded with instructions that, when executed by the processor, cause the processor to perform further operations, comprising:
   based on determining that the primary user of a first collaboration device is proximate to the first collaboration device, disabling the non-primary user from utilizing the first collaboration device to initiate communication with the at least one second collaboration device of the primary user.

16. A first collaboration device comprising:
   at least one memory element for storing data; and
   at least one processor for executing instructions associated with the data, wherein executing the instructions causes the first collaboration device to perform operations, comprising:
      determining that a non-primary user of the first collaboration device is proximate to the first collaboration device; and
      based on determining that a primary user of the first collaboration device is not proximate to the first collaboration device, enabling the non-primary user to utilize the first collaboration device to initiate communication with at least one second collaboration device of the primary user.

17. The first collaboration device of claim 16, wherein determining that the non-primary user of the first collaboration device is proximate to the first collaboration device is based on the first collaboration device detecting a third collaboration device that is associated with the non-primary user being proximate to the first collaboration device.

18. The first collaboration device of claim 17, wherein the detecting is based on wireless communications between the first collaboration device and the third collaboration device of the non-primary user and the detecting includes determining that the third collaboration device is associated with the non-primary user.

19. The first collaboration device of claim 16, wherein executing the instructions causes the first collaboration device to perform further operations, comprising one of:
   the first collaboration device initiating the communication with the at least one second collaboration device of the primary user upon obtaining an input from the non-primary user to the first collaboration device; or
   the first collaboration device automatically initiating the communication with the at least one second collaboration device of the primary user without the non-primary user interacting with the first collaboration device.

20. The first collaboration device of claim 16, wherein executing the instructions causes the first collaboration device to perform further operations, comprising:
   based on determining that the primary user of a first collaboration device is proximate to the first collaboration device, disabling the non-primary user from utilizing the first collaboration device to initiate communication with the at least one second collaboration device of the primary user.

* * * * *